United States Patent
Choo et al.

(10) Patent No.: US 7,982,718 B2
(45) Date of Patent: *Jul. 19, 2011

(54) MOBILE TERMINAL WITH BACK-LIGHTED DIRECTIONAL KEYS

(75) Inventors: Zhi-Min Choo, Gyeonggi-Do (KR); Hyung-Woon Lee, Gyeonggi-Do (KR); Dong-Seuck Ko, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 789 days.
This patent is subject to a terminal disclaimer.

(21) Appl. No.: 11/618,203

(22) Filed: Dec. 29, 2006

(65) Prior Publication Data
US 2007/0105604 A1    May 10, 2007

Related U.S. Application Data

(63) Continuation of application No. 11/468,532, filed on Aug. 30, 2006, now Pat. No. 7,825,907.

(30) Foreign Application Priority Data

Aug. 30, 2005 (KR) ............ 10-2005-0080371
Dec. 30, 2005 (KR) ............ 10-2005-0136199

(51) Int. Cl.
*H04M 1/00* (2006.01)
*G09G 5/00* (2006.01)

(52) U.S. Cl. ............... 345/173; 345/156; 345/169

(58) Field of Classification Search .......... 345/168, 345/156, 169, 173
See application file for complete search history.

(56) References Cited

U.S. PATENT DOCUMENTS

| | | | | |
|---|---|---|---|---|
| 3,789,167 A | * | 1/1974 | Seeger et al. | 200/5 A |
| 4,158,115 A | * | 6/1979 | Parkinson et al. | 200/5 A |
| 4,375,018 A | * | 2/1983 | Petersen | 200/5 A |
| 4,423,294 A | * | 12/1983 | Walser et al. | 200/5 A |
| 4,431,882 A | * | 2/1984 | Frame | 200/5 A |
| 4,433,223 A | * | 2/1984 | Larson et al. | 200/512 |
| 4,567,354 A | * | 1/1986 | Sekine | 235/145 R |
| 5,847,336 A | * | 12/1998 | Thornton | 200/5 A |
| 5,943,044 A | | 8/1999 | Martinelli et al. | |
| 5,960,942 A | * | 10/1999 | Thornton | 200/314 |

(Continued)

FOREIGN PATENT DOCUMENTS

EP    1251455    10/2002

(Continued)

*Primary Examiner* — Bipin Shalwala
*Assistant Examiner* — Afroza Chowdhury
(74) *Attorney, Agent, or Firm* — Lee, Hong, Degerman, Kang & Waimey

(57) ABSTRACT

A mobile terminal includes a first body structured to slideably engage a second body to permit opening and closing of the mobile terminal by relative sliding motion between the first body and the second body. The first body includes a plurality of distinct optically transmissive regions. A display is positioned relative to the first body at one of the distinct optically transmissive regions, and a keypad is positioned relative to the second body. The mobile terminal also includes a selection key for operatively coupling to an underlying touch pad, such that the selection key is identified by one of the distinct optically transmissive regions of the first body. The mobile terminal further includes back-lighted directional keys for operatively coupling to the underlying touch pad. Each of the directional keys is individually identified by one of the distinct optically transmissive regions of the first body, such that the directional keys are positioned at various locations relative to an outer perimeter of the selection key.

16 Claims, 5 Drawing Sheets

U.S. PATENT DOCUMENTS

| | | |
|---|---|---|
| 6,459,424 B1 | 10/2002 | Resman |
| 6,806,815 B1 * | 10/2004 | Kaikuranta et al. ............ 341/22 |
| D502,703 S * | 3/2005 | Tsujimoto et al. ........... D14/346 |
| 6,927,384 B2 * | 8/2005 | Reime et al. ................... 250/221 |
| 6,989,873 B2 * | 1/2006 | Hua-Nan et al. ................ 349/64 |
| 7,034,232 B2 * | 4/2006 | Ide et al. ....................... 200/5 A |
| 7,053,799 B2 * | 5/2006 | Yu et al. .......................... 341/31 |
| 7,151,528 B2 * | 12/2006 | Taylor et al. ................. 345/168 |
| 7,193,620 B2 | 3/2007 | Nguyen et al. |
| 7,331,727 B2 * | 2/2008 | Salman et al. ................ 400/472 |
| 7,495,659 B2 * | 2/2009 | Marriott et al. .............. 345/173 |
| 2002/0005824 A1 * | 1/2002 | Oshitani et al. ................. 345/76 |
| 2003/0034439 A1 * | 2/2003 | Reime et al. ................... 250/221 |
| 2003/0146905 A1 | 8/2003 | Pihlaja |
| 2004/0004602 A1 * | 1/2004 | Cheng et al. ................. 345/169 |
| 2004/0057769 A1 * | 3/2004 | Ward et al. ................... 400/481 |
| 2004/0188639 A1 * | 9/2004 | Masuda et al. ................ 250/552 |
| 2004/0198435 A1 * | 10/2004 | Gauld et al. ................. 455/556.1 |
| 2005/0070349 A1 * | 3/2005 | Kimura ............................ 463/4 |
| 2005/0157971 A1 * | 7/2005 | Juijve et al. .................... 385/12 |
| 2006/0001652 A1 | 1/2006 | Chiu et al. |
| 2006/0037848 A1 * | 2/2006 | Kobayashi .................... 200/310 |
| 2006/0063569 A1 * | 3/2006 | Jacobs et al. ............... 455/575.1 |
| 2006/0152600 A1 * | 7/2006 | Hamada et al. .......... 348/231.99 |
| 2006/0175956 A1 * | 8/2006 | Lai ................................. 313/503 |
| 2006/0256092 A1 | 11/2006 | Lee |
| 2006/0287015 A1 * | 12/2006 | Dunko ........................ 455/575.4 |
| 2006/0293093 A1 * | 12/2006 | Marcus ...................... 455/575.3 |
| 2007/0008239 A1 * | 1/2007 | Stroupe et al. ................. 345/1.1 |
| 2007/0046637 A1 * | 3/2007 | Choo et al. .................... 345/169 |
| 2007/0046646 A1 * | 3/2007 | Kwon et al. ................... 345/173 |
| 2007/0103453 A1 * | 5/2007 | Choo et al. .................... 345/173 |
| 2007/0105604 A1 | 5/2007 | Choo et al. |
| 2007/0142101 A1 * | 6/2007 | Seshagiri et al. .......... 455/575.4 |

FOREIGN PATENT DOCUMENTS

| | | |
|---|---|---|
| EP | 1298888 | 4/2003 |
| EP | 1496674 | 1/2005 |
| JP | 2003298699 | 10/2003 |
| JP | 2004-071223 | 3/2004 |

* cited by examiner

MOBILE TERMINAL WITH BACK-LIGHTED DIRECTIONAL KEYS

CROSS-REFERENCE TO RELATED APPLICATIONS

This application is a continuation of U.S. application Ser. No. 11/468,532, filed Aug. 30, 2006 now U.S. Pat. No. 7,825,907, which pursuant to 35 U.S.C. §119(a), claims the benefit of earlier filing dates and right of priority to Korean Application Nos. 80371/2005 filed on Aug. 30, 2005, and 136199/2005 filed on Dec. 30, 2005, the contents of which are hereby incorporated by reference herein in their entirety.

BACKGROUND OF THE INVENTION

1. Field of the Invention

The present invention relates to a mobile terminal, and more particularly to mobile terminal which includes a selection key and a plurality of back-lighted directional keys.

2. Discussion of the Related Art

A mobile terminal is one type of portable electronic device capable of wireless communication in a mobile environment. Common mobile terminals include mobile phones, personal digital assistants (PDSs), and the like. Consumers have demanded mobile terminals with increasingly thinner dimensions. In many cases, thinner mobile terminals are more convenient to carry.

A typical mobile terminal includes a keypad having key buttons for inputting numbers, letters, and other control commands. An example of a typical keypad of a conventional mobile terminal is shown in FIG. 1, which is a cross-sectional view of a portion of a keypad commonly found in a conventional mobile terminal.

As shown in this figure, keypad 10 includes key buttons 12 exposed to receive contact by a user pressing downward on the buttons. Dome switches 16 are arranged below key buttons 12 and are mounted on an upper surface of circuit board 14. The key buttons are configured to produce signals responsive to user manipulation. Pad 13 is shown attached to a lower surface of key buttons 12, and elastically transforms upon pressing of the key buttons. One purpose of the pad is to assist in the pressurizing of dome switches 16.

Key buttons 12 are shown exposed to the outside of terminal case 11, and typically include characters, numerals, letters, and the like on an upper surface of the button. The buttons are structured to transmit light generated by light emitting diodes (LEDs) 15.

Pad 13 is shown having push protrusions 17, which also assist in pressurizing dome switches 16 upon pressing of key buttons 12. LEDs 15 are often implemented for illuminating the key buttons. The LEDs provide light to the key buttons, which is useful when the mobile terminal is used in a dimly lit environment.

As FIG. 1 illustrates, LEDs 15 protrude from an upper surface of circuit board 14. The LEDs consume significant amounts of space such that they are positioned within a gap formed between pad 13 and circuit board 14. A drawback of this arrangement is that the gap necessarily increases the thickness of the mobile terminal. Another disadvantage is that the dome switches block significant portions of light emitted by the LEDs. As a result, the number of LEDs required to light the various key buttons is often increased so that each key button is sufficiently illuminated. Increasing the number of LEDs consequently results in an undesirable increase in the power requirements of the mobile terminal.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description, and claims hereof, as well as the appended drawings.

In accordance with one embodiment, a mobile terminal includes a first body structured to slideably engage a second body to permit opening and closing of the mobile terminal by relative sliding motion between the first body and the second body. The first body includes a plurality of distinct optically transmissive regions. A display is positioned relative to the first body at one of the distinct optically transmissive regions, and a keypad is positioned relative to the second body. The mobile terminal also includes a selection key for operatively coupling to an underlying touch pad, such that the selection key is identified by one of the distinct optically transmissive regions of the first body. The mobile terminal further includes back-lighted directional keys for operatively coupling to the underlying touch pad. Each of the directional keys is individually identified by one of the distinct optically transmissive regions of the first body, such that the directional keys are positioned at various locations relative to an outer perimeter of the selection key.

In accordance with an embodiment, a touch key assembly is structured to operate with a cover having at least one touch key, which is defined by an optically transmissive region of the cover. A touch pad is coupled to the cover and is shaped to define at least one aperture which forms a light guide that is associated with the touch key. A light source is positioned relative to the bottom side of the touch pad, and is further positioned relative to the light guide to provide light to the touch key. The assembly may also include an optical waveguide positioned relative to the bottom side of the touch pad, the optical waveguide being structured to transmit light. A reflection element operatively associated with the bottom side of the optical waveguide may be used to enhance refection of the light.

In one feature, a separate recess is associated with each light source, the recesses being formed in a top surface of the optical waveguide and sized to receive at least a portion of an associated light source.

In another feature, a light disturbing element associated with the light guide is formed in the optical waveguide.

In yet another feature, the cover includes a plurality of touch keys which are each defined by an optically transmissive region, and the one or more light sources are positioned relative to the light guide to provide light to the touch keys.

In accordance with another feature, each of the light guides include optically transmissive material.

In accordance with yet another feature, a printed circuit board (PCB) is used to control the touch pad.

In one feature, the touch pad is one of a capacitance touch pad or a pressure-sensitive touch pad. Alternatively, the touch pad is shaped to define an aperture which forms the light guide.

In accordance with an alternative embodiment a mobile terminal includes a housing containing a display, and a touch key assembly associated with the housing. The touch key assembly is structured to operate with a cover having at least one touch key, which is defined by an optically transmissive region of the cover. A touch pad is coupled to the cover and is shaped to define at least one aperture which forms a light guide that is associated with the touch key. A light source is positioned relative to the bottom side of the touch pad, and is further positioned relative to the light guide to provide light to the touch key. The assembly may also include an optical waveguide positioned relative to the bottom side of the touch pad, the optical waveguide being structured to transmit light. A reflection element operatively associated with the bottom side of the optical waveguide may be used to enhance reflection of the light.

In one feature, the housing includes a first body and a second body, such that the first body is structured to slideably engage the second body. The display and touch key assembly are coupled to the first body, and the mobile terminal further includes a key pad coupled to the second body. Alternatively, the display is coupled to the first body, the touch key assembly is coupled to the second body, and the mobile terminal further includes a key pad coupled to the first element.

In another feature, the touch key assembly is integrated with the housing.

In yet another feature, the display is positioned at an upper portion of the housing and the touch key assembly is positioned at a lower portion of the housing, the touch key assembly being centered at about a medial plane of the housing.

In accordance with yet another embodiment a method of making a touch key assembly includes forming a light guide in a touch pad, positioning at least one light source relative to a bottom side of the touch pad, and positioning the light source relative to the light guide to provide light to the light guide.

In accordance with one aspect, the method further includes positioning an optical waveguide relative to the bottom side of the touch pad, or positioning a reflection element relative to a bottom side of the optical waveguide.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
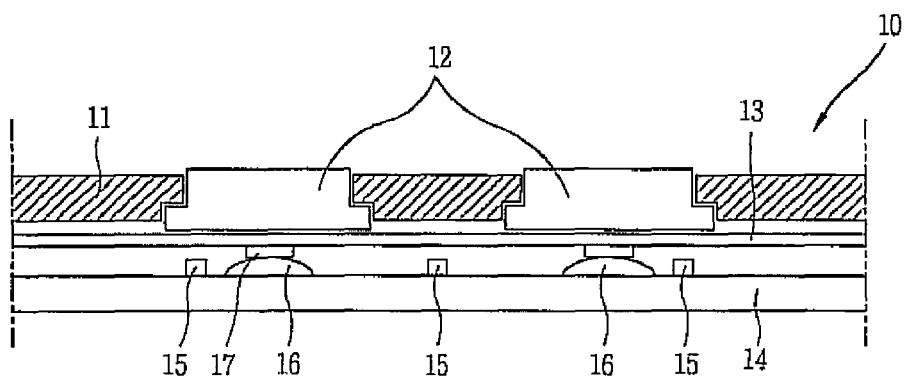
FIG. 1 is a cross-sectional view of a portion of a keypad commonly found in a conventional mobile terminal.
Figure 2:
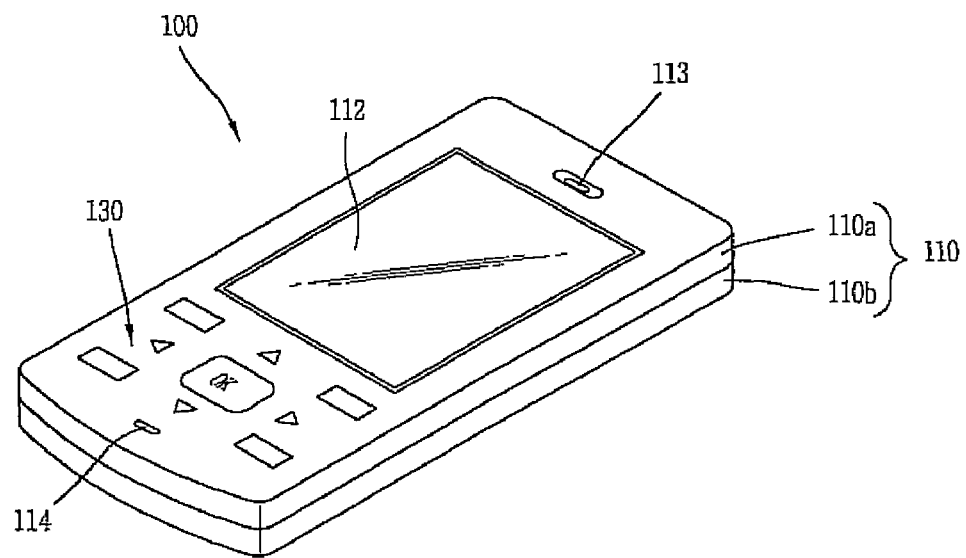
FIG. 2 is a perspective view of a mobile terminal according to an embodiment of the present invention.

FIG. 2 is a perspective view of a mobile terminal according to an embodiment of the present invention. As shown, mobile terminal 100 includes body 110, which has display 112, speaker 113, and touch key assembly 130 formed on an upper side of the body. Body 110 is further defined by first body 110a and second body 110b. The touch key assembly is located at one end of the first body, below the display. The touch key assembly may be used to receive input from a user, and thus may include one or more touch keys (described in more detail in later figures). In an embodiment, various touch keys of touch key assembly 130 may be configured to cooperate with items presented on display 112.

Figure 3:
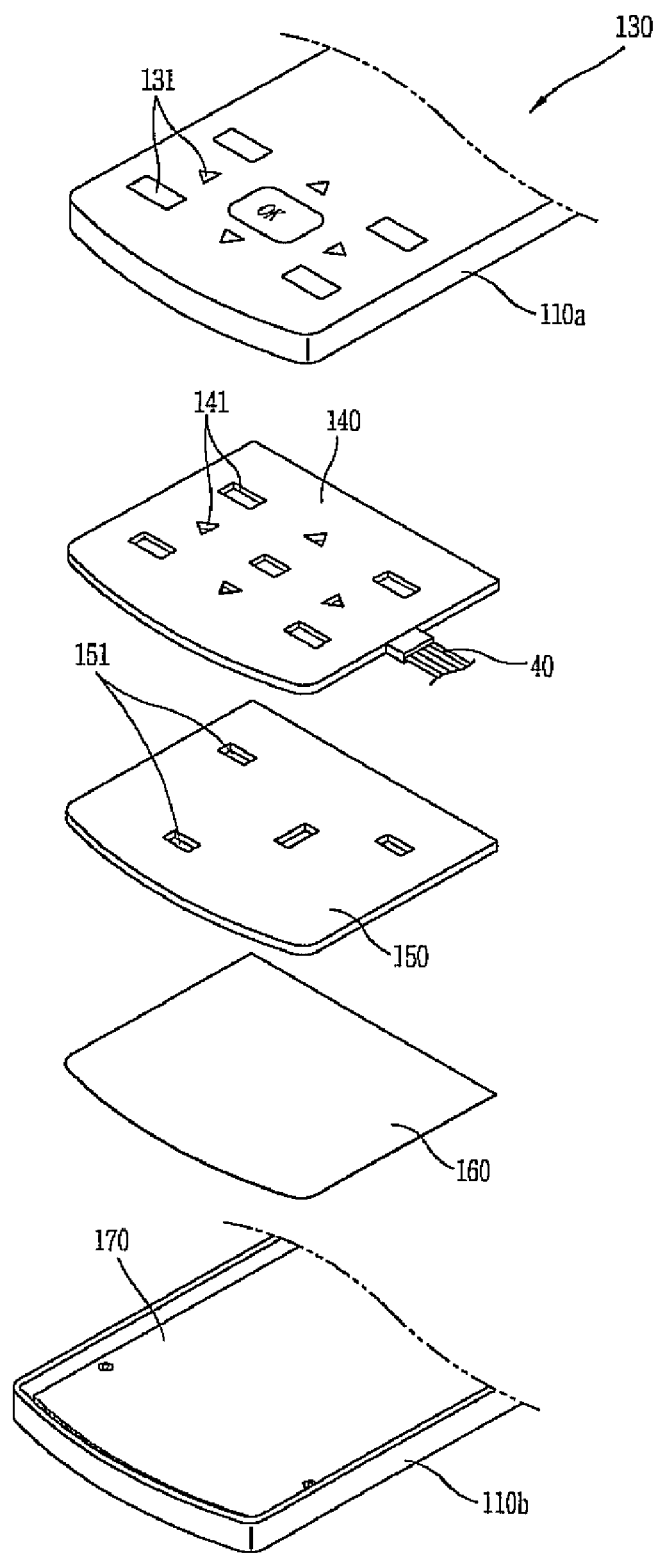
FIG. 3 is perspective view showing relevant portions of a disassembled touch key assembly.
Figure 4:
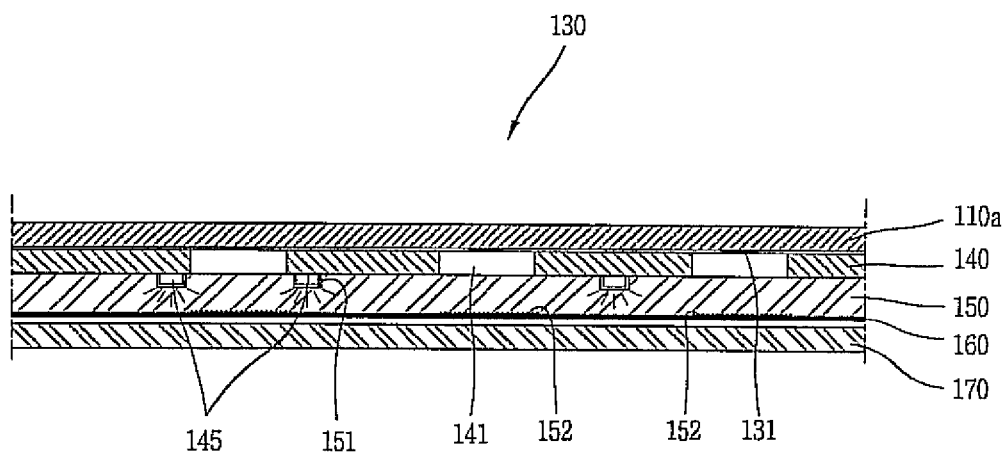
FIG. 4 is a cross-sectional view showing relevant portions of an assembled touch key assembly.
Figure 5:
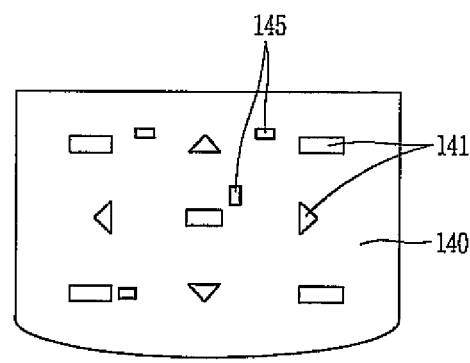
FIG. 5 is a bottom view of a touch pad utilized in the touch key assembly of FIG. 4.

FIG. 3 is perspective view showing relevant portions of disassembled touch key assembly 130. FIG. 4 is a sectional view showing relevant portions of an assembled touch key assembly. FIG. 5 is a bottom view of touch pad 140. Various embodiments of the present invention will now be described with reference to FIGS. 3-5.

Touch key assembly 130 is shown with touch pad 140 operatively coupled to first body 110a, which may implemented as a cover. Assembly 130 may further include optional components such as optical waveguide 150, reflection element 160, or both components. Light sources 145 are shown positioned relative to the bottom side of touch pad 140. If desired, the light sources may be directly coupled to the touch pad. The various components of assembly 130 are shown positioned over a printed circuit board (PCB) 170. The PCB is shown located within second body 110b, but such positioning is not a requirement.

In an embodiment some or all of first body 110a may be formed from a transparent or semitransparent material. It is desirable for such material to be sufficiently rigid to serve has a housing for mobile terminal 100, for example. Touch keys 131 may be configured such that they are each defined by an optically transmissive region surrounded by regions which do not transmit light. The touch keys may be integrated with first body 110a (e.g., the cover), or these elements may be discrete components.

One technique for forming touch keys 131 is to introduce an opaque material, such as ink, over certain portions of the first housing. Touch keys 131 may be defined as areas of the first body which do not include the opaque materials. Incident light will be transmitted by optically transmissive regions of the first body, and will not be transmitted by the portions of the first body which include the opaque material. Various types, shapes, and numbers of touch keys may therefore be formed using this technique.

Touch pad 140 may be implemented using conventional touch pad technologies which are capable of detecting user manipulation or other contact with an associated touch key 131. During use, the touch pad generates signals which may be communicated to main PCB 170 via flexible printed circuit board (FPCB) 40, for example. Touch pad 140 may be coupled to the bottom side of first body 110a using known techniques (e.g., adhesive, tape, and the like). Suitable touch pads include, for example, pressure-sensitive touch pads, capacitance touch pads, and the like.

Touch pad 140 may also include one or more strategically located light guides 141. As shown, each light guide 141 is associated with an individual touch key 131. As an example, the touch pad may be shaped to define an aperture which forms an individual light guide. Light guides 141 are often implemented to permit light provided by light sources 145 to pass through touch pad 140, and consequently, optically transmissive touch keys 131. If desired, optically transmissive material may be formed within some or all of the light guides. This feature enhances the structural integrity of the touch pad.

Light sources 145 may be implemented using known devices and structures which can provide light at the wavelength of interest to one or more touch keys 131. Typical light sources include light emitting diodes (LEDs) and vertical surface emitting lasers (VCSELs), among others. The light sources may receive the necessary power via FPCB 40, which is associated with touch pad 140 and is in communication with main PCB 170.

It is notable that light emitted by light sources 145 is not unnecessarily hindered by structures, which is common in conventional assemblies. More specifically, light emitted by light sources 145 reaches touch keys 131 relatively unimpeded. This reduces the number of needed light sources, which consequently reduces the power requirements of the assembly.

Although possible, it is not necessary for each touch key 131 to have an associated light source 145. In general, the number of light sources is fewer than the number of touch keys. In some implementations, a single light source provides sufficient light to all touch keys. Maximum light to the touch keys may be achieved by positioning each light source relatively close to an associated light guide 141.

Optical waveguide 150, which is an optional component, is shown positioned relative to the bottom side of touch pad 140. The waveguide may be formed from a suitable material (e.g., glass or plastic) which transmits light at the wavelength of interest. If desired, optical waveguide 150 may be coupled to the bottom side of touch pad 140 using known techniques (e.g., adhesive, tape, and the like). It is not a requirement that the waveguide 150 actually contact touch pad 140. As an alternative, these components may be placed in a close physical relationship, but not actually contacting each other.

Optical waveguide 150 may further include one or more additional features. For instance, as more clearly shown in FIG. 3, the waveguide may include a separate recess 151 individually associated with each of the light sources 145. Each recess may be formed in a top surface of the optical waveguide, and is typically sized to receive at least a portion of an associated one of the light sources. The recesses permit a relatively tight coupling between waveguide 150 and touch pad 140, thereby reducing the need for a gap between these components. Since no gap is needed to allow for clearance for the light sources, the overall thickness of the assembly may be reduced.

Optical waveguide 150 is also shown having optional light disturbing elements 152. These elements may be formed on the bottom side of the waveguide at locations which correspond to each of the light guides 141. One purpose of the light disturbing elements is to intensify reflected light received by touch keys 131 (via light guides 141). If desired, the light disturbing elements may be structured to form a concave shape to further intensify the reflected light. One technique for forming the light disturbing elements is to scratch the bottom surface of the waveguide.

Optional reflection element 160 is shown operatively associated with the bottom side of optical waveguide 150. The reflection element may be implemented using material which is structured to reflect light from light sources 145. Possible materials include a reflection sheet formed as a thin metal plate, resin coated with gold foil, or paper.

Operation of mobile terminal 100 implementing touch key assembly 130 may proceed as follows. After the mobile terminal is activated, light is emitted by light sources 145 and travels through optical waveguide 150. The light is reflected by reflection element 160 and light disturbing elements 152, causing light to propagate through light guides 141 and corresponding touch keys 131. This lighting function may be continuously employed, or activated only during periods of reduced lighting conditions as controlled by, for example, a manual switch or via a light sensor (not shown).

Figure 6:
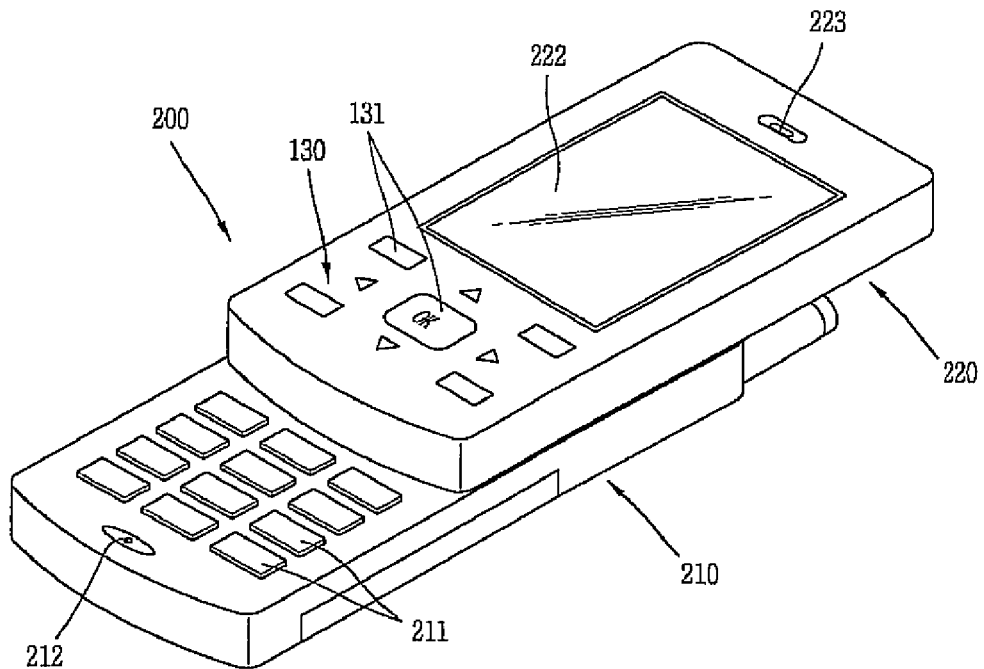
FIG. 6 is a perspective view of a slide-type mobile terminal according to an alternative embodiment of the present invention.

FIG. 6 is a perspective view of a slide-type mobile terminal according to an alternative embodiment of the present invention. Mobile terminal 200 includes first body 220, which is structured to slideably engage second body 210. Display 222, speaker 223, and touch key assembly 130 are coupled to the first body. Key pad 211 and microphone 212 are shown positioned on an upper surface of second body 210. The second body can be opened or closed by providing relative sliding motion between the first and second bodies. If desired, touch key assembly 130 may be located at second body 210, and key pad 211 located at first body 220. Another alternative is to replace key pad 211 on second body 210 with a second touch key assembly 130, such that the mobile terminal includes two touch key assemblies.

Figure 7:
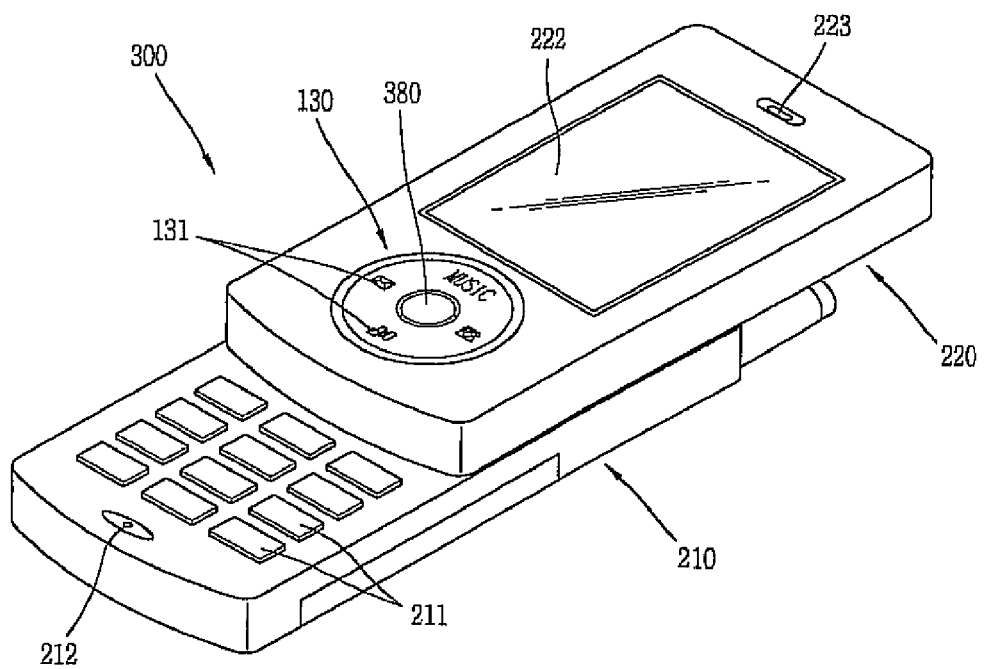
FIG. 7 is a perspective view of a slide-type mobile terminal according to yet another alternative embodiment of the present invention.

Embodiments of the present invention are not limited to the specific arrangement of the touch keys disclosed herein. For instance, one possible alternative is shown in FIG. 7, which is a perspective view of a slide-type mobile terminal according to another alternative embodiment of the present invention. In this figure, mobile terminal 300 includes a circular touch key assembly 130 which has several touch keys 131. The touch key assembly of this embodiment is shaped to permit positioning of push key 380, which may be lighted using conventional techniques.

Figure 8:
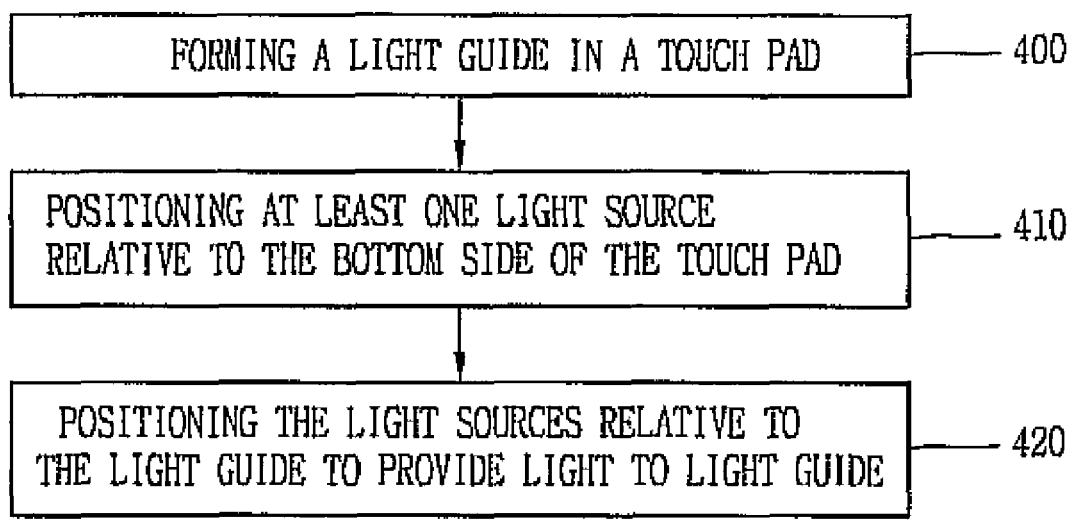
FIG. 8 is a flowchart showing a method of making a touch key assembly according to an embodiment of the present invention.

FIG. 8 is a flowchart showing a method of making a touch key assembly according to an embodiment of the present invention. As shown, block 400 includes forming a light guide in a touch pad. Block 410 includes positioning at least one light source relative to the bottom side of the touch pad. This operation may be accomplished by coupling the light source to the bottom side of the touch pad. Block 420 includes positioning the light source relative to the light guide to provide light to the light guide. If desired, the method may further include positioning an optical waveguide relative to the bottom side of the touch pad, or positioning a reflection element relative to a bottom side of the optical waveguide, or perform both operations.

Various touch key assemblies have been described herein as being implemented in conjunction with flip-type, bar-type, and slide-type, mobile terminals. However, embodiments of the present invention are not so limited and other configurations are possible and within the teachings of the present disclosure. If desired, a touch key assembly may alternatively be implemented in other devices and systems in which lighted keys and other locations is desired. Such devices and systems include portable digital assistants (PDAs), hand-held computers, audio and video players, and the like.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile terminal, comprising:
    a first body structured to slideably engage a second body to permit opening and closing of said mobile terminal by relative sliding motion between said first body and said second body, wherein said first body comprises an optically opaque region and a plurality of distinct optically transmissive regions which are defined by said optically opaque region;
    a display on said first body at one of said plurality of distinct optically transmissive regions;
    a keypad on said second body;
    a selection key operatively coupled to an underlying touch pad, wherein said selection key is defined by one of said plurality of distinct optically transmissive regions of said first body;
    a plurality of directional keys operatively coupled to said underlying touch pad, wherein each of said plurality of directional keys is individually defined by one of said plurality of distinct optically transmissive regions of said first body, and wherein said plurality of directional keys are positioned at various locations relative to an outer perimeter of said selection key; and
    a plurality of light guides formed in said touch pad, each of said plurality of light guides being individually associated with one of said selection key and said plurality of directional keys,
    wherein the optically opaque region and the plurality of distinct optically transmissive regions are all coplanar.

2. The mobile terminal according to claim 1, further comprising:
    at least one light source positioned relative to a bottom side of said touch pad, said at least one light source being a structure that is separate from said plurality of directional keys and being positioned to provide light to one or more of said plurality of touch keys.

3. The mobile terminal according to claim 2, further comprising:
    an optical waveguide positioned relative to a bottom side of said touch pad, said optical waveguide structured to transmit said light.

4. The mobile terminal according to claim 3, further comprising:
    a reflection element operatively associated with a bottom side of said optical waveguide and structured to reflect said light.

5. The mobile terminal according to claim 3, further comprising:
    a separate recess associated with each of said at least one light source, said recess formed in a top surface of said optical waveguide and sized to receive at least a portion of an associated one of said at least one light source.

6. The mobile terminal according to claim 3, further comprising:
    a separate light disturbing element associated with each of said plurality of light guides and which are formed in said optical waveguide.

7. The mobile terminal according to claim 1, wherein said selection key is a back-lighted selection key.

8. A mobile terminal, comprising:
    a first body structured to slideably engage a second body to permit opening and closing of said mobile terminal by relative sliding motion between said first body and said second body;
    a cover defined by an upper portion of said first body, wherein said cover comprises an optically opaque region and a plurality of distinct optically transmissive regions which are defined by the optically opaque region;
    a display located at said cover at one of said plurality of distinct optically transmissive regions;
    a keypad located at said second body;
    a selection key operatively connected with an underlying touch pad, wherein said selection key is defined by one of said plurality of distinct optically transmissive regions of said cover;
    a plurality of directional keys operatively connected with said underlying touch pad, wherein each of said plurality of directional keys is individually defined by one of said plurality of distinct optically transmissive regions of said cover, and wherein said plurality of directional keys are positioned at various locations relative to an outer perimeter of said selection key; and
    a plurality of light guides formed in said touch pad, each of said plurality of light guides being individually associated with one of said selection key and said plurality of directional keys,
    wherein the optically opaque region and the plurality of distinct optically transmissive regions are all coplanar.

9. The mobile terminal according to claim 8, further comprising:
    at least one light source positioned relative to a bottom side of said touch pad, said at least one light source structured to provide light to said selection key and said plurality of directional keys.

10. The mobile terminal according to claim 9, further comprising:
    an optical waveguide positioned relative to a bottom side of said touch pad, said optical waveguide structured to transmit said light.

11. The mobile terminal according to claim 10, further comprising:
    a reflection element operatively associated with a bottom side of said optical waveguide and structured to reflect said light.

12. The mobile terminal according to claim 10, further comprising:
    a separate recess associated with each of said at least one light source, said recess formed in a top surface of said optical waveguide and sized to receive at least a portion of an associated one of said at least one light source.

13. The mobile terminal according to claim 10, further comprising:
    a separate light disturbing element associated with each of said plurality of light guides and which are formed in said optical waveguide.

14. A mobile terminal, comprising:
    a body comprising an optically opaque region and a plurality of distinct optically transmissive regions which are defined by said optically opaque region;
    a display at the body at one of the plurality of distinct optically transmissive regions;

a selection key operatively connected an underlying touch pad, wherein said selection key is defined by one of said plurality of distinct optically transmissive regions of the body; and a plurality of directional keys operatively connected to said underlying touch pad, wherein each of said plurality of directional keys is individually defined by one of the plurality of distinct optically transmissive regions of the body, and wherein the plurality of directional keys are positioned at various locations relative to an outer perimeter of the selection key, wherein the optically opaque region and the plurality of distinct optically transmissive regions are all coplanar, wherein one or more of the plurality of directional keys are structured to be illuminated by a lighting device that is separate from the directional keys, and wherein the directional keys are positioned to receive light from the lighting device but not themselves generate light.

15. The mobile terminal according to claim 1, wherein one or more of the plurality of directional keys are structured to be illuminated by a lighting device that is separate from the directional keys, and wherein the directional keys are positioned to receive light from the lighting device but do not themselves generate light.

16. The mobile terminal according to claim 14, wherein the body is structured to define a bar-type terminal body.

* * * * *